Patented May 20, 1930

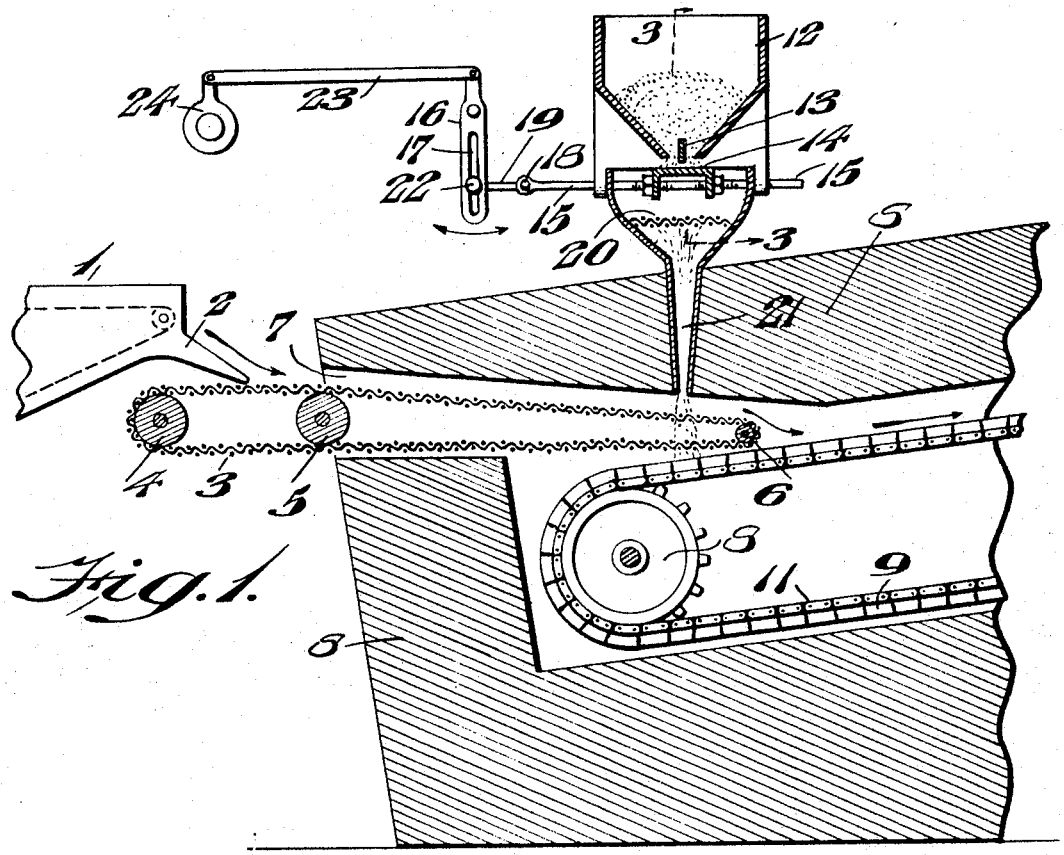
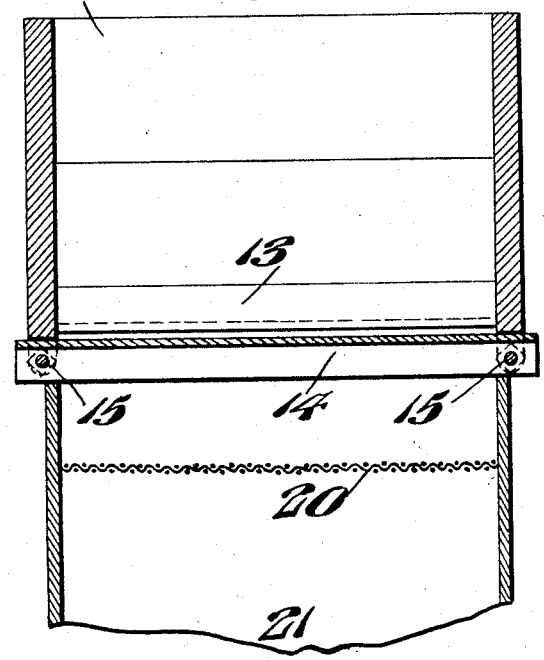
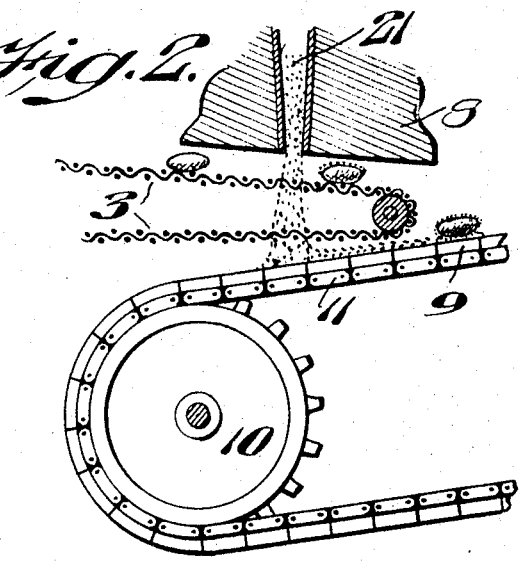

1,759,608

UNITED STATES PATENT OFFICE

WILLIAM EHRHART, OF LANCASTER, PENNSYLVANIA

APPARATUS FOR TREATING PRETZELS, CRACKERS, AND THE LIKE

Application filed June 28, 1929. Serial No. 374,485.

This invention relates to apparatus for preparing unbaked pretzels, crackers, and similar articles formed of dough for baking and has more especial relation to apparatus for salting the surfaces of pretzels.

The leading object of the present invention may be said to reside in the provision of apparatus whereby articles formed of dough previous to baking may be provided upon both their upper and lower surfaces as they pass from the cooking solution to the baking oven with a dry, powdery substance, as for instance, salt or sugar.

A further object of the present invention is to provide apparatus of the character stated in which is provided conveying apparatus formed of wire or equivalent mesh whereby the powdery substance as fed to the edible articles may pass through the mesh to the oven conveyor so that a deposit of the powdery material is conveyed to the surface of the oven conveyor so that not only is the edible article coated upon its upper surface, but is capable of collecting additional powdery substance in its travel through the oven.

A still further object of the present invention is to provide reciprocatory means arranged upon the oven for feeding powdery substance into the oven and through a mesh conveyor to a conventional oven conveyor.

Other and further objects reside in the provision of general details of construction and arrangement and combination of parts for attaining the results sought by the foregoing objects.

The invention consists of the novel construction hereinafter described and finally claimed.

The nature, characteristic features and scope of the invention will be more fully understood from the following description taken in connection with the accompanying drawings forming part hereof, and in which:

Fig. 1. is a fragmentary view principally in central section of an oven for baking dough products and illustrating the manner of feeding a powdery substance to the articles to be baked.

Fig. 2, is a fragmentary view illustrating detail of construction shown in Fig. 1.

Fig. 3, is a view in section taken upon line 3—3 of Fig. 1.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, the reference numeral 1 designates a compartment containing a solution in which pretzels, crackers, or similar articles formed of dough are conveyed for cooking purposes and are delivered, as for instance, through a chute 2 to an endless conveyor 3 preferably formed of wire mesh, although other mesh material may be employed. The endless band 3 is driven by a roller 4 and passes over other rollers 5 and 6. The endless band 3 passes through an opening 7 in oven 8 so that in its travel the forward run thereof extends well over the endless conveyor 9 arranged within the oven 8. The endless conveyor 9 is driven by sprocket wheel 10, meshing with a sprocket chain 11 to which the conveyor parts 9 are attached. Supported by the oven top is a sprinkling attachment comprising a hopper 12 having arranged at the outlet or bottom end thereof a vertically disposed partition 13 so that instead of a single exit a pair of spaced exists are provided. Immediately below these exits or outlet ports there is arranged a slide 14. This slide is arranged for reciprocating or back and forth movement below the outlets or ports as carried by a pair of rods 15. The slide 14 in operation derives its back and forth movement from a link 16 slotted as at 17. The rods 15 have pivotal connection as at 18 with a link 19 which is adjustable in slot 17. The link 19 is adjustable through slot 17 by means of set screw 22 to procure the proper throw of the slide 14. The link 16 at its upper end has pivotal connection with a rod 23. This rod 23 is connected to a member 24 mounted upon a shaft driven from any desired source. As this shaft completes a single revolution the link 16 is rocked back and forth to permit salt or the like to pass from hopper 12. In the connection it is to be noted that the space below the partition 13 and the egress opening in the hopper prevents frictional contact or grinding of the hopper contents with respect to the slide. Below the slide 14 is arranged a screen 20 of wire mesh.

From the above description it is apparent that as the slide 14 is reciprocated back and forth salt or other material in the hopper 12 is fed to the spout 21 of the hopper upon the pretzels as they are fed upon the mesh endless conveyor to the main conveyor 9. It is to be noted in this respect that the salt or other powdery material may pass through the mesh conveyor so as to be deposited upon the main conveyor whereby it is possible not only to salt the tops of the pretzels but the bottoms of the pretzels may also be coated because of the salt which is passed through the conveyor 3 to the main conveyor.

Having thus described my invention, what I claim as new and desire to secure by Letters Patent, is:

1. In apparatus of the character stated, an oven, a main conveyor in said oven, a hopper for containing a powdery material, means operative to sprinkle said material upon edible articles conveyed through the oven, and an auxiliary conveyor of mesh overlapping the main conveyor beneath said hopper whereby at least some of the powdery material may pass through the mesh of the auxiliary conveyor to the main conveyor.

2. In apparatus of the character stated, an oven, a main conveyor in said oven, a hopper for containing a powdery material, means including a reciprocating slide, operative to sprinkle said material upon edible articles being conveyed through the oven, and an auxiliary conveyor of mesh overlapping the main conveyor beneath said hopper whereby at least some of the powdery material may pass through the mesh of the auxiliary conveyor to the main covering.

3. In apparatus of the character stated, an oven, a main conveyor in said oven, a hopper for containing a powdery material, said hopper having a pair of opposed outlets, means operative to sprinkle said material upon edible articles being conveyed through the oven, and an auxiliary conveyor of mesh overlapping the main conveyor beneath said hopper whereby at least some of the powdery material may pass through the mesh of the auxiliary conveyor to the main conveyor.

4. In apparatus of the character stated, an oven, a main conveyor in said oven, a hopper for containing a powdery material, said hopper having a pair of opposed outlets, means including a reciprocating slide operative to sprinkle said material upon edible articles being conveyed through the oven, said slide being free of said outlets to prevent frictional contact therewith, and an auxiliary conveyor of mesh overlapping the main conveyor beneath said hopper whereby at least some of the powdery material may pass through the mesh of the auxiliary conveyor to the main conveyor.

5. In apparatus of the character stated, an oven, a main conveyor in said oven, a hopper for containing a powdery material, said hopper having a pair of opposed outlets, a slide operative below said opposed outlets, a rocker arm for moving said slide back and forth, a rotating shaft, means connecting said shaft with said rocker arm for operating said slide, said slide being free of said outlets to prevent frictional contact therewith, and an auxiliary conveyor of mesh overlapping the main conveyor beneath said hopper whereby at least some of the powdery material may pass through the mesh of the auxiliary conveyor to the main conveyor.

WILLIAM EHRHART.